United States Patent [19]
Nosek

[11] 3,981,381
[45] Sept. 21, 1976

[54] SELF-CONTAINED MULTIPLATE WET CLUTCH

[75] Inventor: Thaddeus W. Nosek, Roseville, Mich.

[73] Assignee: Borg-Warner Corporation, Chicago, Ill.

[22] Filed: Mar. 10, 1975

[21] Appl. No.: 557,144

[52] U.S. Cl. .......................... 192/70.18; 192/70.13; 192/70.14; 192/70.28; 192/113 B
[51] Int. Cl.² .................. F16D 13/56; F16D 13/74
[58] Field of Search .......... 192/70.13, 70.14, 70.18, 192/70.28, 107 R, 113 B; 188/71.5, 72.3, 264 E

[56] References Cited
UNITED STATES PATENTS

| | | | |
|---|---|---|---|
| 1,415,690 | 5/1922 | Parret | 192/113 B |
| 2,270,467 | 1/1942 | Nutt | 192/70.18 X |
| 2,794,526 | 6/1957 | Canfield | 192/113 B |
| 2,956,649 | 10/1960 | Kelley | 188/264 |
| 3,025,686 | 3/1962 | Lewis | 192/113 B X |
| 3,061,062 | 10/1962 | Smirl | 192/70.18 |
| 3,237,739 | 3/1966 | Pritchard | 192/89 B |
| 3,335,834 | 8/1967 | Wach | 192/113 B |
| 3,366,210 | 1/1968 | Webster | 192/113 B |
| 3,548,984 | 12/1970 | Root | 192/70.17 |
| 3,695,407 | 10/1972 | Peery | 192/113 B |

FOREIGN PATENTS OR APPLICATIONS

| | | | |
|---|---|---|---|
| 1,233,968 | 6/1971 | United Kingdom | 192/70.18 |

*Primary Examiner*—Allan D. Herrmann
*Attorney, Agent, or Firm*—James A. Geppert

[57] ABSTRACT

A multiplate wet clutch assembly including a sealed housing adapted to be mounted on an engine flywheel and providing a sump for cooling fluid. The clutch includes a driving member and a driven member consisting of two or more clutch plates, with each clutch plate having integral fluid-scooping members or diverters on its outer periphery adapted to dip into the sump and divert fluid inwardly along diagonal slots from which the fluid feeds into grooves in friction facings on the plates and then outwardly by centrifugal force. To accommodate two or more clutch plates, an adapter ring is positioned between the clutch housing and the flywheel to provide spacing for additional clutch plates and extra sump capacity for the cooling fluid.

18 Claims, 8 Drawing Figures

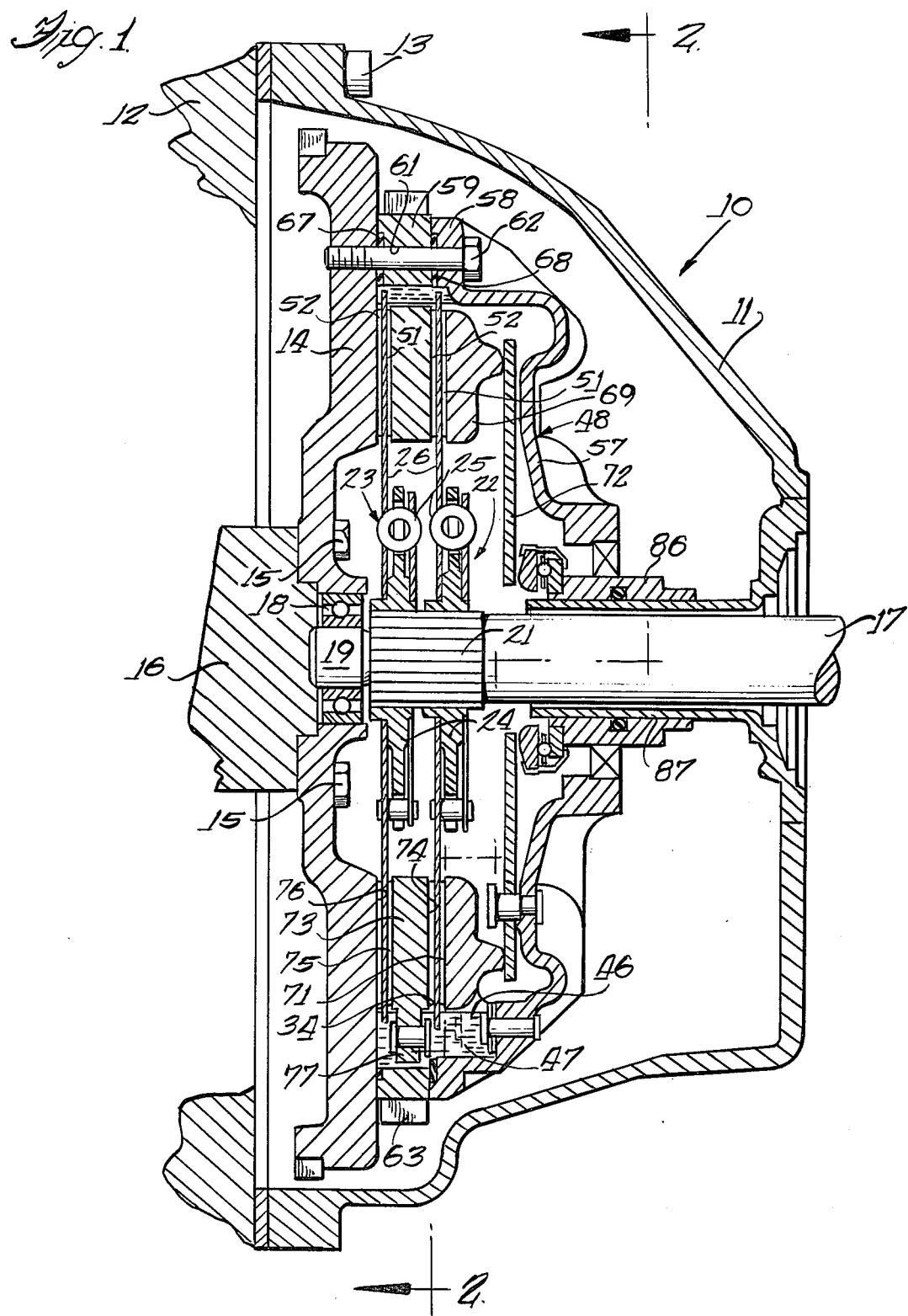

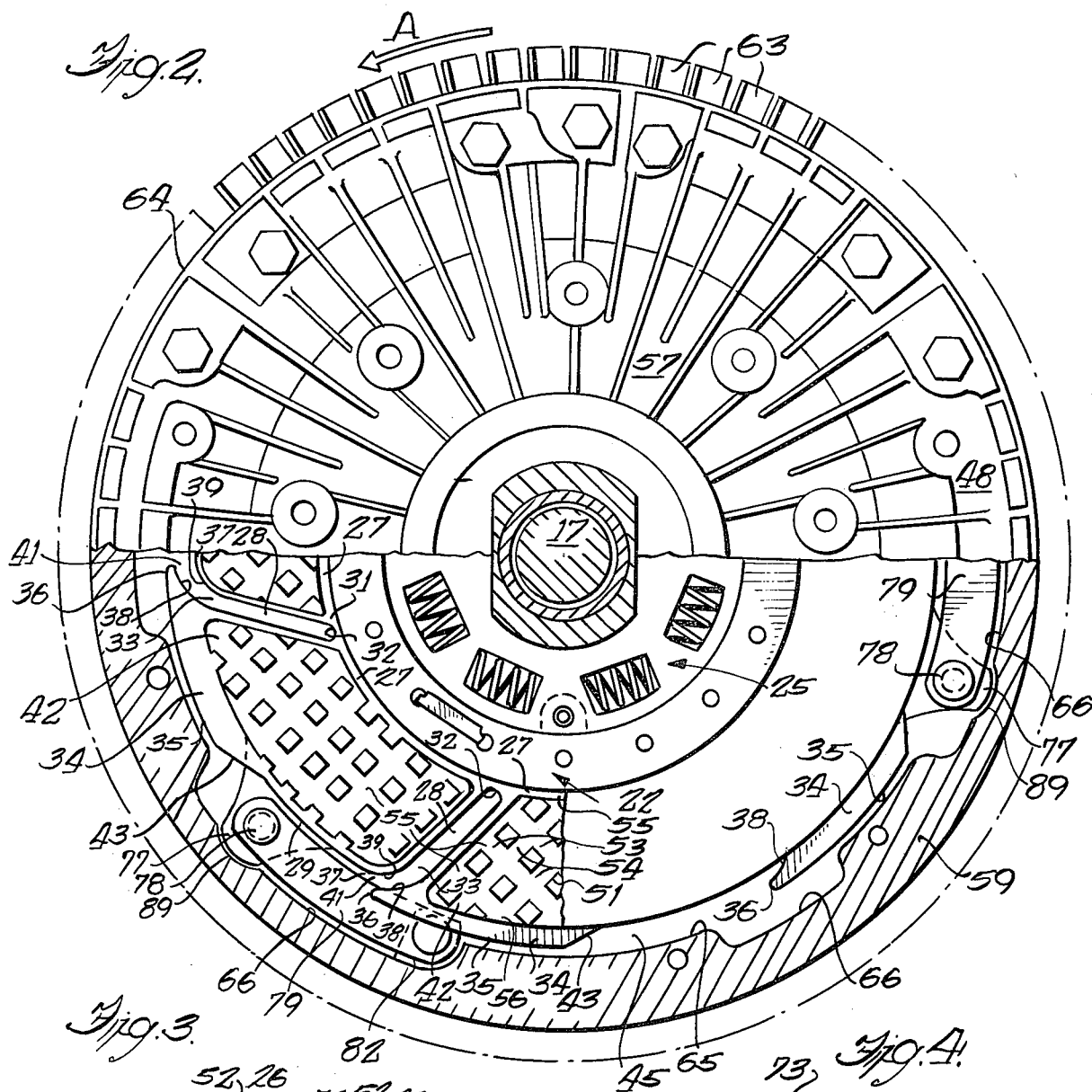
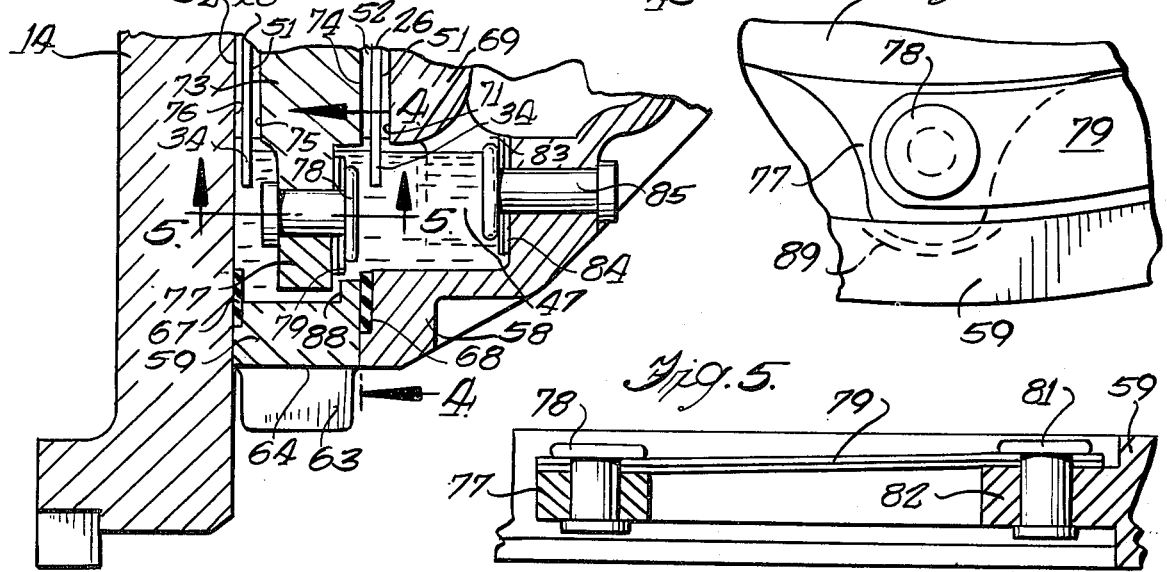

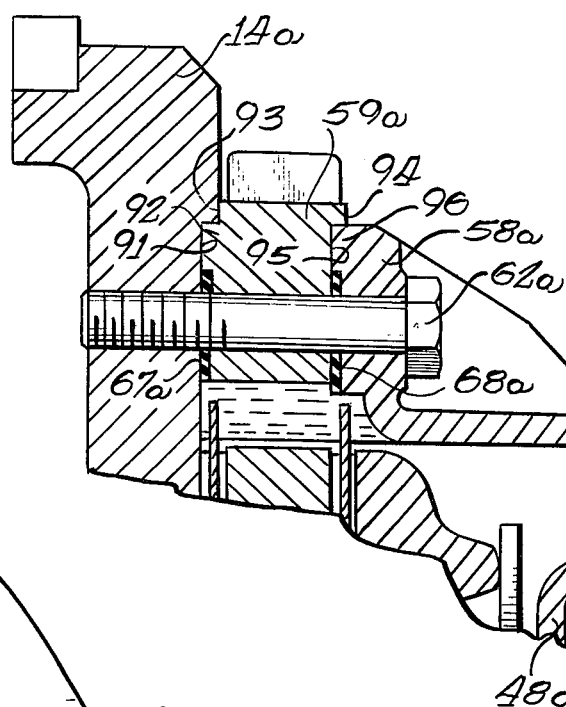
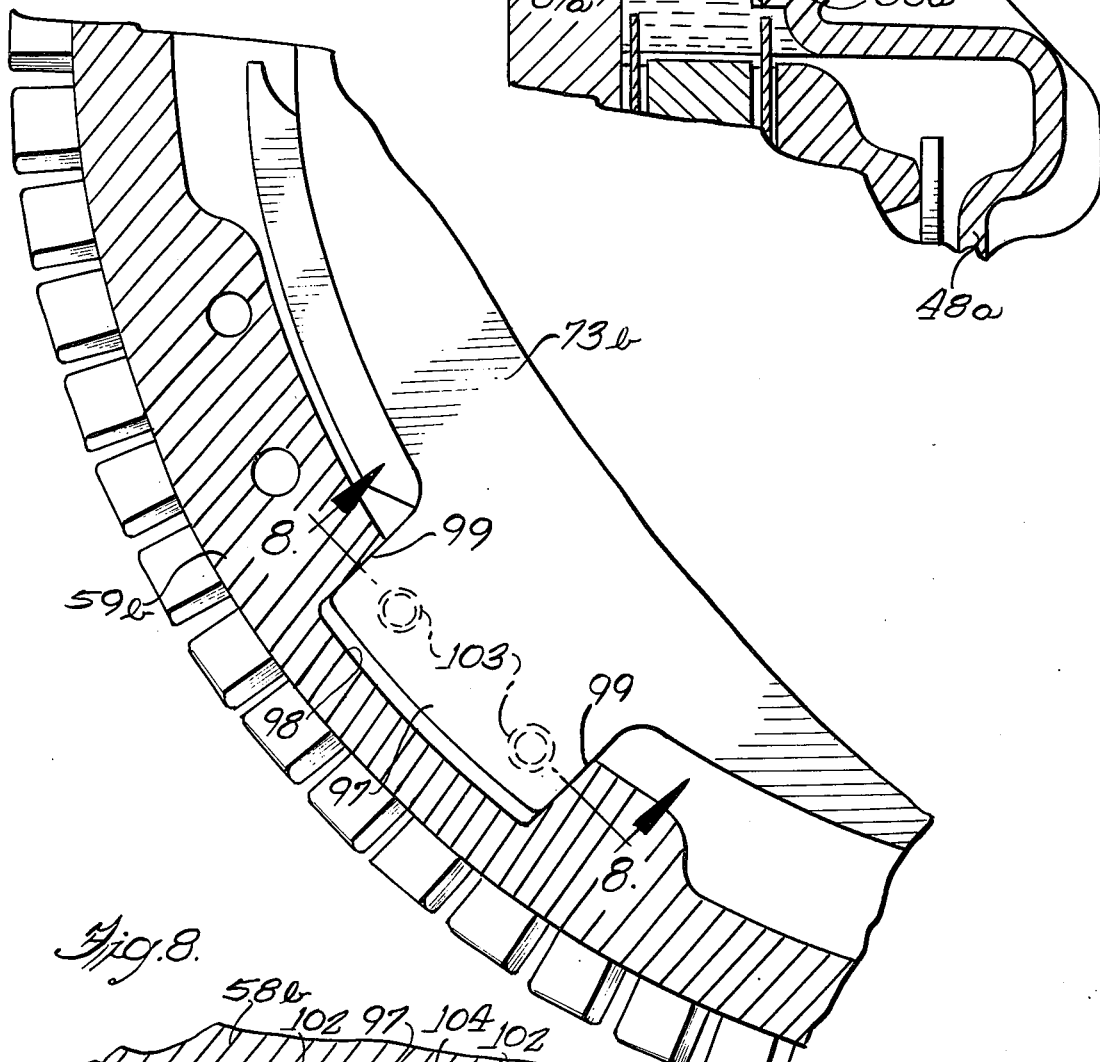
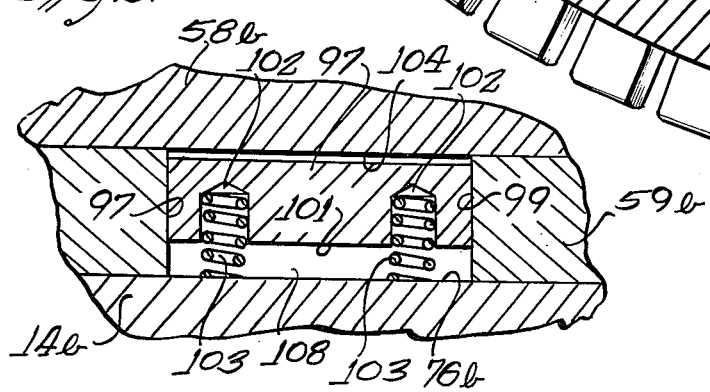

3,981,381

SELF-CONTAINED MULTIPLATE WET CLUTCH

SUMMARY AND BACKGROUND OF THE INVENTION

Various arrangements have been proposed to dissipate heat from the friction linings of clutch plates by the introduction of fluid between the friction linings and the faces of the adjacent plates. Presently, fluid is introduced at the central portion of the clutch around a driven shaft and centrifugal force acts to move the fluid radially outwardly across the friction surfaces. Fully engaged, all members including the mass of oil under the influence of centrifugal force revolve together with no churning. Heretofore, stationary curved tubes have been secured in the housing, each having a leading inlet port dipping into the sump and a trailing outlet port communicating with an internal storage and feeding means or an exterior reservoir and cooling means. Fluid is pumped through the system due to the impetus of the moving fluid entering the curved tubes.

The present invention is an improvement over application Ser. No. 416,919, filed Nov. 19, 1973, and entitled "Wet Clutch With Coolant Distributor", now U.S. Pat. No. 3,897,860. This application relates to a wet clutch assembly wherein the clutch plate is provided on its periphery with a plurality of integral diverters associated with diagonal inwardly extending slots to direct fluid inwardly of the clutch against centrifugal force when there is relative rotation between the housing and the clutch plate. The present invention provides the capability for this wet clutch of using more than one clutch plate to increase its capacity to handle higher powered engines.

Among the objects of the present invention is the provision of a self-contained wet clutch having the capability of using two or more clutch plates for heavy duty operations. Each clutch plate is provided with a plurality of diagonal slots dividing the plate into segments and each segment has an integral diverter on its outer periphery. To accommodate the extra thickness of one or more additional clutch plates, an adapter or spacer ring formed of a high heat conductive material is positioned between the clutch housing and the flywheel and is provided with external cooling fins to enhance the heat transfer characteristics thereof.

Another object of the present invention is the provision of a self-contained multiplate wet clutch having an adapter ring located between the clutch housing and the flywheel and an intermediate pressure plate positioned between the clutch plates. A strap drive is provided between the adapter ring and the intermediate pressure plate to permit a precise preassembly of the ring and intermediate plate before assembly of the clutch to the flywheel. Also, the straps function as retractor springs for the intermediate plate independent of the retraction device for the primary pressure plate.

A further object of the present invention is the provision of a self-contained wet clutch having an adapter or spacer ring positioned between the flywheel and the clutch housing and providing accurate piloting means wherein the ring is piloted in the flywheel, and the clutch housing or cover is piloted in the ring. The pilots for the ring and cover are dimensioned to be of the same diameter so the same flywheel could accept either a single or a multiplate clutch depending on the severity of the service.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a vertical cross sectional view of the clutch assembly of the present invention shown in an operating condition therefor.

FIG. 2 is a vertical cross sectional view taken generally on the irregular line 2—2 of FIG. 1.

FIG. 3 is an enlarged partial vertical cross sectional view of the lower portion of FIG. 1 showing the adapter ring and strap drive.

FIG. 4 is a view of the drive lug on the intermediate plate taken on the line 4—4 of FIG. 3.

FIG. 5 is an elevational view of the lug and drive strap taken on the line 5—5 of FIG. 2.

FIG. 6 is an enlarged partial vertical cross sectional view showing an alternate method of positioning the adapter ring in the assembly.

FIG. 7 is an enlarged partial vertical cross sectional view similar to FIG. 2 but showing an alternate drive arrangement for the intermediate pressure plate.

FIG. 8 is a cross sectional view taken on the line 8—8 of FIG. 7.

DESCRIPTION OF THE PREFERRED EMBODIMENTS

Referring more particularly to the disclosure in the drawings wherein are shown illustrative embodiments of the present invention, FIGS. 1 through 5 disclose a clutch assembly 10 including a bell-shaped housing 11 of generally conventional form suitably secured to an engine block 12, as by bolts 13, and encompassing a flywheel 14 which is suitably secured, as by bolts 15, to an engine output shaft 16 forming a driving unit.

An output or drive shaft 17, coaxial with the engine output shaft 16, is rotatably supported and piloted relative to the flywheel 14 through a bearing 18 at the reduced forward end 19 of shaft 17. This shaft is splined, as at 21, to provide a positive direct connection to a pair of clutch disk units 22 and 23 forming a driven unit. Each clutch disk unit is identical and includes a hub 24 splined to the shaft 17 and a damping device 25 connecting the hub with a clutch plate 26.

Each clutch plate 26 has a plurality of circumferentially spaced sections or segments 27 which define slots or fluid passages 28 therebetween; the slots extending diagonally inwardly from the outer periphery 29 of the plate to the inner peripheral portion 31 thereof and are oriented at a positive angle of inclination in the direction of rotation of the plate, whereby the inner closed end 32 of each slot at the inner portion of the plate is disposed ahead of the outer end 33 of the slot at the outer periphery 29.

Provided on the outer periphery of each segment 27 is a diverter or scoop 34 formed integrally with the segment as a projection thereof and having a width equal to the thickness of the segment. Each diverter has an outer peripheral edge 35 and the forward or leading portion of the diverter is formed as a finger 36 which extends in a circumferential direction beyond the forward edge of the related segment in overlapping relation to the slot or passage 28 immediately ahead of the segment. The finger 36 extends in overlapping relation to the trailing portion 37 of the segment thereahead and tapers forwardly to form a pointed node. The inner edge of the finger is formed with a concave fluid guide or fluid scooping surface 38 which is generally parallel with a curved edge 39 of the adjacent trailing portion of the segment thereahead and forms a forwardly directed inlet 41 therewith.

The diverter 34 is located on the forward portion 42 of its respective section or segment and has a trailing edge 43 which gradually slopes inwardly of the disk and merges into the annular peripheral edge 29 of the disk which is located inwardly of the diverter. Thus, behind each diverter there is formed an unobstructed large pocket 45 which is easily filled by the cooling fluid, such as oil 46, from a sump 47 in the outer part of the inner clutch housing 48 as the clutch is rotated. It should be understood that the terminology used in referring to the portion 37 as a trailing portion and the finger 36 as a leading portion refers to leading and trailing portions with respect to the direction of relative rotation between driving member of flywheel 14 and the driven member including the clutch disk units 22, 23. The disk units are both rotating in the same direction as the driving member or flywheel 14, as indicated by the arrow A in FIG. 2; however, until full engagement, the clutch disk units rotate at a slower speed than the flywheel 14. Disk units 22 and 23 thus have a direction of relative rotation with respect to the flywheel opposite to the arrow A or in a clockwise direction.

Each segment of each clutch plate is provided on its opposite faces with friction linings or pads 51 and 52, preferably formed of non-metallic well known materials and constrained for rotation therewith either by rivets or by bonding with a suitable adhesive. Each pad has a waffle grid formed thereon by generally parallel intersecting sets of grooves 53 and 54. Some of the grooves 53 and 54 open into an adjacent fluid passage 28 and others open into the peripheral portion 31 to provide fluid inlets 55 for the cooling fluid passing outwardly under the impetus of centrifugal force caused by rotation of the clutch plates, and most of the grooves 53 and 54 open at the periphery of the segments in outlets 56 for the fluid.

The clutch assembly 10 includes the inner clutch housing or cover 48 having a radially extending wall 57 terminating in a generally circular lip 58 adapted to be directly bolted to the flywheel 14 for a single plate clutch. Interposed between the lip 58 of the cover and the flywheel is an adapter or spacer ring 59 having openings 61 to receive the bolts 62 to secure the ring and cover 48 to the flywheel. The ring is provided with integral radially extending, angularly oriented cooling fins 63 formed on the exterior surface 64 thereof. The interior surface 65 of the ring is generally cylindrical with pockets or recesses 66 to increase the sump capacity of the clutch. The ring is provided with an annular recess to receive a suitable sealing ring 67 and the lip surface of the cover 49 is likewise recessed to receive a second sealing ring 68.

Disposed within the clutch cover 48 is a conventional annular pressure plate 69 having a pressure face 71 engaging one side of the clutch disk unit 22 and actuated by a conical spring member 72 to its engaged position. Between the clutch disk units 22 and 23 and generally radially aligned with the spacer ring 59 is an annular intermediate pressure plate 73 having oppositely disposed pressure faces 74 and 75 engaging the friction pads of the clutch disk units 22 and 23, respectively. The flywheel or driving member 14 also has a pressure face 76 engaging the side of unit 23 opposite to the intermediate plate 73. The diverters 34 on the clutch plates 26 extend radially outward beyond the peripheries of the pressure plate 69 and intermediate plate 73 into the sump 47.

The intermediate plate 73 is provided with a plurality of outwardly extending circumferentially spaced lugs 77 which are suitably secured, as by rivets 78, to drive straps 79 located within the fluid 46 in the sump 47. The opposite ends of the straps are secured, as by rivets 81, to ears 82 formed on the interior surface 65 of the adapter ring 59. These straps provide the driving connection between the fastened-together flywheel 14, ring 59 and cover 48 and the intermediate plate 73, and also act as a centering means and a retracting means for the plate 73 as will be later described. Likewise, the pressure plate 69 is provided with lugs 83 suitably secured to drive straps 84, secured by rivets 85 at their opposite ends to the cover 48.

A conventional axially reciprocable release carrier 86 movable by a pedal-actuated fork (not shown) is shiftable relative to a support member 87 to engage the spring member 72 and release the pressure on the pressure plate 69 to release the clutch. Under normal clutch engagement, the normally flat drive straps 79 and 84 are offset, as seen in FIG. 5, preloading them to be effective as retractor springs on disengagement of the clutch. A shoulder 88 formed by an arcuate recess 89 in the adapter ring 59 provides a positive stop limiting movement of the intermediate plate 73 upon clutch disengagement.

With the clutch disengaged, the transmission in gear and the engine idling, the flywheel, adapter ring and pressure plates are rotating at a low speed, with the cooling oil forming a generally annular band on the interior of the adapter ring and cover due to centrifugal force. As the speed of the engine shaft 16 is increased and the clutch pedal is gradually released, it allows the spring to urge the pressure plate 69 towards the flywheel 14 and cause engagement of the pressure plate 69 with the clutch disk unit 22; the clutch disk unit 22 with the intermediate plate 73; the plate 73 with clutch disk unit 23; and the clutch disk unit 23 with the flywheel 14. Thus, the slots 28 and grooves 53 and 54 are substantially closed axially by the plates 69 and 73 and flywheel 14 to form fluid flow passages as the clutch plates 26, 26 begin to rotate with the flywheel and cover, but at a slower rate. Thus, the clutch plates have relative rotation in the opposite direction to rotation of the flywheel so that cooling oil will be scooped up by the diverters 34 and directed into the diagonal slots 28 to the inner periphery 31, where centrifugal force causes the fluid to enter the grooves 53, 54 and move outwardly to the periphery 29.

FIG. 6 discloses an alternate mounting arrangement for the adapter ring with like parts having the same reference numerals with a script $a$. The flywheel 14$a$ has a generally circular recess 91 receiving a pilot 92 on one face 93 of the adapter ring 59$a$; the pilot having a recess for a sealing ring 67$a$. On the opposite face 94 of the adapter ring is a recess 95 to receive a second pilot 96 formed on the circular flange 58$a$ of the cover 48 a; the pilot 96 having a recess to receive a sealing ring 68$a$. As shown, suitable fastening means, such as bolts 62$a$, extend through the flange 58$a$ and pilot 96 and ring 59$a$ and pilot 92 to threadingly engage the flywheel 14$a$ to retain the assembly together.

The pilots 92 and 96 are of the same diameter so that the same flywheel 14a could accept a single plate clutch with the pilot 96 received in the recess 91 in the flywheel 14a or a double plate clutch with the adapter ring 59a interposed between the cover and flywheel depending on the severity of service. The use of the pilots 92 and 96 provides a considerably more accurate alignment between the parts.

FIGS. 7 and 8 disclose an alternate drive arrangement for the intermediate plate with like parts provided with the same reference numerals with the addition of a script b. In this embodiment, the drive straps for the intermediate plate 73b have been omitted and three radially outwardly extending lugs 97 are formed on the plate, with the lugs extending into complementary recesses 98 formed in the adapter ring 59b. The recesses 98 provide substantially parallel side walls 99, 99 extending the full width of the ring 59b between the flywheel 14b and the flange 58b on the cover 48b to guide the movement of the lugs and the plate. One face 101 of each lug 97 has two recesses 102, 102 to receive a pair of compression springs 103, 103 which bottom in the recesses and abut against the face 76b of the flywheel 14b.

As disclosed for the embodiment of FIGS. 1 through 5, when the release carrier is moved forwardly to engage the spring adjacent its iner periphery to release the pressure exerted on the pressure plate, the springs 103, 103 act to urge the intermediate plate 73b away from the flywheel, with movement of the plate being limited by engagement of the lugs with the face 104 of the circular flange 58b on the clutch cover. Obviously, one or more than two compression springs 103 can be used for each lug 97 of the intermediate plate 73b and more than three lugs 97 could be utilized on the plate 73b, if necessary.

I claim:

1. A clutch assembly comprising driving and driven members rotatable about a common axis, said members having relative rotation when said clutch assembly is disengaged or when said clutch is not fully engaged, one of said members including two or more plates, each plate having friction clutching surface means thereon, and the other of said members including a flywheel, a clutch cover, and a unitary spacer ring interposed between and sealingly engaging the flywheel and cover, a pressure plate on the opposite side of the plates from said flywheel, at least one intermediate pressure plate between said plates, means connecting said spacer ring with said intermediate plate to cause the intermediate plate to rotate with the flywheel, spacer ring and clutch cover, and piloting means to accurately align the spacer ring and the clutch cover with the flywheel, comprising a circular pilot on one side of the spacer ring and a recess on the opposite side thereof, said flywheel having a recess in its interior face conformably receiving said spacer ring pilot, and said clutch cover having a flange facing the spacer ring with a pilot formed thereon conformably received in said spacer ring recess.

2. A clutch assembly as set forth in claim 1, in which said pilots and said recesses receiving the same are all of substantially the same diameter.

3. A clutch assembly comprising driving and driven members rotatable about a common axis, said members having relative rotation when said clutch assembly is disengaged or when said clutch is not fully engaged, one of said members including two or more plates, each plate having friction clutching surface means thereon, and the other of said members including a flywheel, a clutch cover, and a spacer ring interposed between the flywheel and cover, a pressure plate on the opposite side of the plates from said flywheel, at least one intermediate pressure plate between said plates, and means connecting said spacer ring with said intermediate plate, said flywheel, spacer ring, and cover defining a closed fluid sump in the area of the interior periphery of said spacer ring.

4. A clutch assembly as set forth in claim 3, wherein each plate has diagonal slots sub-dividing the plate into a series of circumferentially spaced segments, fluid diverter means on each segment extending outwardly thereof into the sump and adapted to direct fluid into an adjacent slot.

5. A clutch assembly as set forth in claim 3, wherein said connecting means comprises a plurality of preloaded drive straps suitably fastened to said intermediate plate and said spacer ring to cause said intermediate plate to rotate with the flywheel, spacer ring and clutch cover and to act as retractor springs for the intermediate plate when the clutch is disengaged, and said pressure plate is independently connected to said clutch cover by additional drive straps acting as retractor springs therefor.

6. A clutch assembly as set forth in claim 3, wherein said spacer ring has a plurality of radially outwardly extending and angularly oriented cooling fins on the exterior surface thereof.

7. A clutch assembly as set forth in claim 3, wherein said intermediate pressure plate is provided with a plurality of circumferentially spaced radially extending drive lugs, and said spacer ring has shallow pockets in the interior surface receiving the outer ends of said drive lugs with each pocket defining a shoulder acting as a release stop to limit axial movement of the intermediate plate.

8. A clutch assembly as set forth in claim 7, in which said connecting means comprises a plurality of drive straps, one end of each strap being secured to each drive lug and the other end being secured to said spacer ring.

9. A clutch assembly as set forth in claim 3, including piloting means to accurately align the spacer ring and the clutch cover with the flywheel.

10. A clutch assembly as set forth in claim 9, in which said piloting means comprises a generally circular pilot formed on one side of the spacer ring and a recess formed in the opposite side of the ring, said flywheel having a recess in its interior face complementary to the spacer ring pilot, and said clutch cover has a flange facing the spacer ring and having a pilot formed thereon conformably received in said spacer ring recess.

11. A clutch assembly as set forth in claim 4, in which said pilots and said recesses receiving the same are all of substantially the same diameter.

12. A clutch assembly as set forth in claim 3, in which said connecting means comprises a plurality of radially outwardly extending integral lugs on said intermediate plate, and said spacer ring has recesses formed in the interior surface thereof conformably receiving said lugs.

13. A clutch assembly as set forth in claim 12, in which said recesses extend between the flywheel and a flange on the clutch cover to allow axial movement of the intermediate plate, and resilient means urging said intermediate plate away from the flywheel.

14. A clutch assembly as set forth in claim 13, in which each lug has one or more recesses therein facing said flywheel, and said resilient means comprises compression springs received in said recesses and abutting the adjacent surface of said flywheel.

15. A clutch assembly comprising driving and driven members rotatable about a common axis, said members having relative rotation when said clutch assembly is disengaged or when said clutch is not fully engaged, one of said members including two or more plates, each plate having friction clutching surface means thereon, and the other of said members including a flywheel, a clutch cover, and a spacer ring interposed between the flywheel and cover, said spacer ring having circumferentially spaced pockets in the interior peripheral surface therein to increase the sump capacity for cooling fluid, a pressure plate on the opposite side of the plates from said flywheel, at least one intermediate pressure plate between said plates, and means connecting said spacer ring with said intermediate plate.

16. In a clutch for connecting a driving shaft with a driven shaft wherein said clutch comprises a sealed housing including a clutch cover, a flywheel and a spacer ring interposed therebetween, said housing having a sump with coolant fluid therein, said clutch including at least two driven plates partially immersed in said sump with an intermediate drive plate interposed between said driven plates, each driven plate having a plurality of equally spaced diagonal slots extending inwardly from the outer periphery thereof and integral fluid diverter projections extending radially outwardly therefrom to an extent sufficient to dip into the sump pursuant to rotation of the clutch plate to divert fluid into an adjacent slot, a pressure plate positioned between the driven plates and the clutch cover, and means operatively connecting said intermediate drive plate with said spacer ring to rotate therewith.

17. A clutch as set forth in claim 16, in which said connecting means includes a plurality of radially extending drive lugs on said intermediate drive plate, and a plurality of drive straps secured to said drive lugs and extending to and secured with said spacer ring, said straps being preloaded to resiliently bias said intermediate drive plate away from said flywheel.

18. A clutch as set forth in claim 16, in which said connecting means includes a plurality of circumferentially spaced drive lugs extending radially from said intermediate drive plate, said spacer ring having slots formed in the interior surface conformably receiving said drive lugs, and resilient means operatively engaging said drive lugs to urge said intermediate drive plate away from said flywheel.

* * * * *

UNITED STATES PATENT OFFICE
CERTIFICATE OF CORRECTION

PATENT NO. : 3,981,381
DATED : September 21, 1976
INVENTOR(S) : Thaddeus W. Nosek It is certified that error appears in the above-identified patent and that said Letters Patent are hereby corrected as shown below:

Claim 11, cancel "Claim 4" and insert -- Claim 10 --.

Signed and Sealed this

Fourteenth Day of December 1976

[SEAL]

*Attest:*

RUTH C. MASON
*Attesting Officer*

C. MARSHALL DANN
*Commissioner of Patents and Trademarks*